June 4, 1963   M. DOSSIER   3,092,227
ONE-WAY CLUTCHES AND IN PARTICULAR FREE-WHEELS
Filed Dec. 14, 1961   3 Sheets-Sheet 1

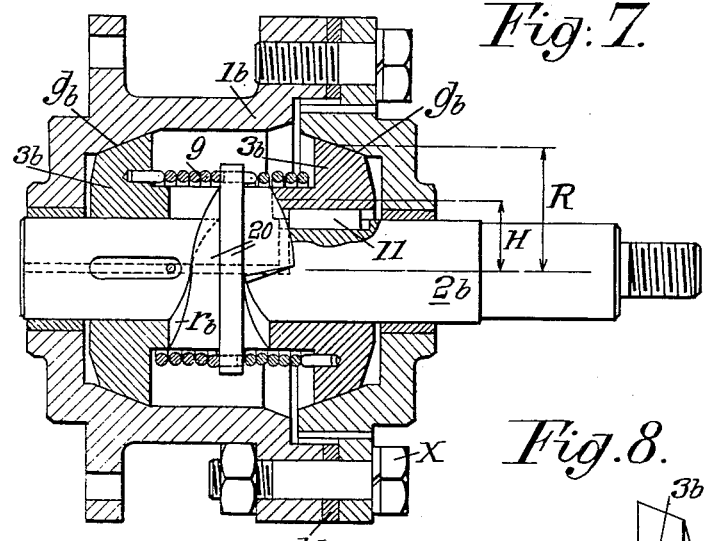
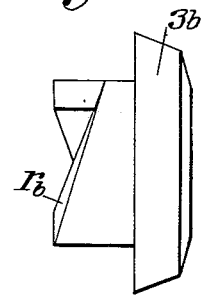
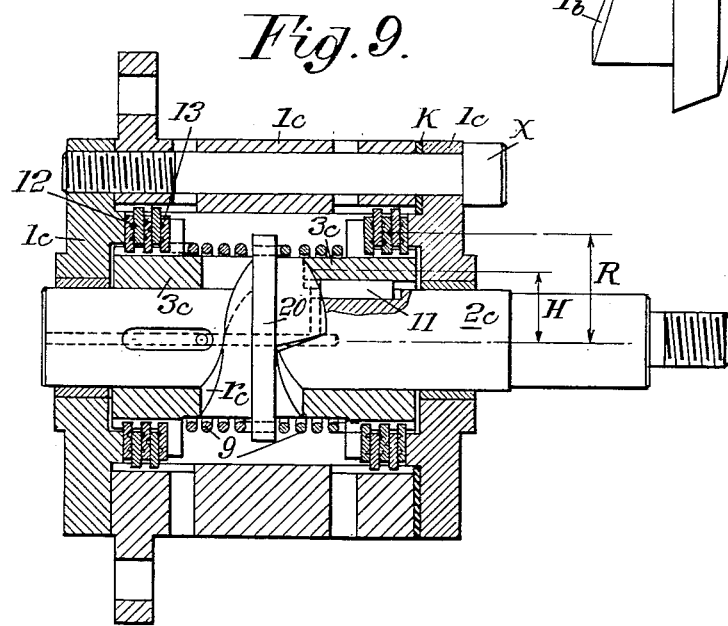

United States Patent Office 3,092,227
Patented June 4, 1963

3,092,227
ONE-WAY CLUTCHES AND IN PARTICULAR
FREE-WHEELS
Michel Dossier, "Bois Fleuri," Rue de Bethemont,
Orgeval, France
Filed Dec. 14, 1961, Ser. No. 159,296
Claims priority, application France Dec. 14, 1960
5 Claims. (Cl. 192—41)

The present invention relates to one-way clutches, i.e. to coupling devices comprising two units mounted movable with respect to each other, the first of these units comprising a slideway parallel to the direction of relative movement of said units and the second one comprising at least one surface oblique to this direction of movement, and wedging means interposed between said two units and having two surfaces arranged to cooperate frictionally with said slideway and said oblique surface respectively, so as to permit free movements with respect to each other, in one direction, and to prevent, by wedging, relative movement in the opposed direction, when the clutch is in action.

The invention is more especially concerned with one-way clutches of this kind called free-wheels.

The object of my invention is to provide a one-way clutch which is better adapted to meet the requirements of practice than those known up to this time and in particular such that clutch disengagement takes place without any resistance of the wedging means to relative movement in the first mentioned direction.

According to my invention the above mentioned wedging means surfaces make with each other a wedge angle greater than the limit angle of friction of said wedging means with respect to said oblique surface of the second unit, said units being arranged so that, for a virtual relative sliding thereof, the friction work is greater on the slideway of the first unit than on the oblique surface of the second unit.

All the features of my invention will become apparent in the course of the following detailed description of same embodiments thereof with reference to the appended drawings, given merely by way of example, and in which:

FIG. 7 is a diagrammatic axial section of a free-wheel according to still another embodiment of invention, making use of helical surfaces;

FIG. 8 separately shows in elevation one of the elements of the free-wheel of FIG. 7;

FIG. 9 is a view similar to FIG. 7, showing a modification.

Figure 1:
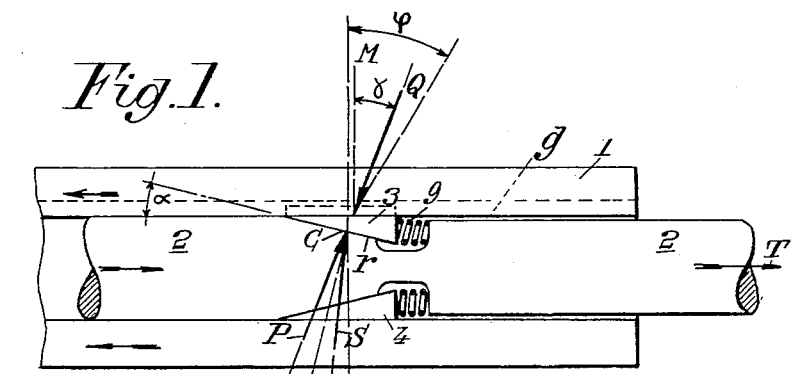
FIG. 1 is a diagrammatic elevational view of a one-way clutch made according to my invention.
Figure 2:
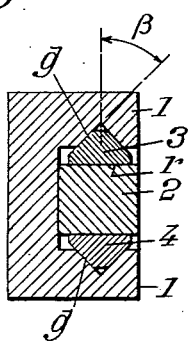
FIG. 2 is a cross section of the clutch of FIG. 1.

I will first describe, with reference to FIGS. 1 and 2, the principle of my invention in the case of two units 1 and 2 having a rectilinear movement with respect to each other.

Unit 1 forms a slideway in which slidable member 2 is movable, these two units 1 and 2 having, relatively to each other, rectilinear translatory movements parallel to the direction of the slideway.

Between units 1 and 2, I interpose wedges 3 and 4 each of which bears respectively upon a slideway $g$ parallel to the above mentioned direction and belonging to unit 1, and upon an oblique surface $r$ belonging to unit 2. Each of these wedges is subjected to a resilient return force, for instance exerted by relatively weak springs 9 which, in the known manner, serve to start the wedging effect. Of course it will be understood that this return force might be magnetic, or exerted by the force of gravity, and so on.

Each of these wedges constitutes, between units 1 and 2, a coupling member the function of which is to prevent displacements of unit 2 with respect to unit 1 in the direction of arrow T and to permit relative displacements in the opposed direction. The apex angle $\alpha$ made with the direction of slideway $g$ by the plane of contact of a wedge 3 with the corresponding oblique surface $r$, i.e. the wedge angle, is a characteristic angle which, according to the present invention, must be greater than the limit angle of friction $\phi$ of the wedge with respect to said oblique surface $r$ in order to avoid any resistance due to wedging when the movement of unit 2 with respect to unit 1 tends to start in the permitted direction, i.e. in the direction opposed to that of arrow T.

To permit a good understanding of my invention I will give the definition of the limit angle of friction between two sliding bodies in contact with each other.

Let it be supposed, for instance, (FIG. 1), that the two bodies in question are wedge 3 and unit 1, in contact with each other along surface $g$, if M is the normal to this surface of contact and $\gamma$ the angle between this normal M and the resultant Q of the contact forces exerted by unit 1, upon wedge 3 (which must be balanced by a reaction force P), there is a limit value of angle $\gamma$, called $\phi$, so that if $\gamma$ is smaller than $\phi$ bodies 3 and 1 are wedged with respect to each other, whereas if $\gamma$ is greater than $\phi$ these bodies can slide with respect to each other. This limit angle does not depend upon the value or magnitude of force Q, but exclusively upon the characteristics of the bodies in contact with each other. It is called "limit angle of friction" and $tg\phi$ is called the "friction coefficient" between bodies 1 and 3.

In a likewise manner there is, between wedge 3 and the oblique surface $r$ of unit 2, a limit angle of friction, designated by $\psi$, shown in FIG. 1, on the other side of the normal N to oblique surface $r$.

According to my invention the wedge angle $\alpha$ has a value greater than that of the limit angle of friction $\psi$.

Owing to this condition, when the clutch is disengaged i.e. when the force exerted upon unit 2 is reversed so as to have a direction opposed to that of arrow T and thus to produce relative movement between units 1 and 2 in the permitted direction, there is no residual wedging liable to oppose this movement. It will be understood that during the wedging that precedes this clutch disengagement, when the force exerted upon unit 2 was in the direction of arrow T, the three bodies 1, 2, 3 undergo resilient deformations and, therefore, the fact that the force acting upon unit 2 is first reduced to zero and then reversed, is not necessarily accompanied by the immediate reduction to zero of the forces exerted between these bodies, which may for a very short time continue to have a wedging effect. However, if according to my invention $\alpha$ is greater than $\psi$ the resultant S of the forces that may still be exerted by unit 2 upon wedge 3 necessarily has a tangential component in the direction of arrow T, so that any wedging is excluded.

This is the main feature of the invention, but it still remains to show that when the condition $\alpha > \psi$ is complied with, it remains possible to ensure the desired wedging when the forces exerted on unit 2 is in the direction of the arrow T of FIG. 1.

For this purpose, $\varphi$ being the limit angle of friction between bodies 1 and 3, and the force of spring 9 being neglected, the condition is:

(1) $$\operatorname{tg} \varphi > \operatorname{tg}\ (\varphi + \alpha)$$

which, for small values of these angles, is equivalent to:

$$\varphi > \psi + \alpha$$

This relation indicates that, for a virtual displacement of wedge 3 in a direction opposed to that of arrow T, the work of the contact forces upon slideway $g$ is greater than the work of the contact forces upon oblique surface $r$.

Since, according to my invention, $\alpha > \psi$ wedging implies that:

(2) $\qquad \varphi > 2\psi$ provided that $\alpha$ is such that:

(3) $\qquad \varphi < \alpha < \varphi - \psi$

In order to comply with Condition 2 it is necessary, on the one hand, to have the friction between wedge 3 and unit 2 relatively small and, on the other hand, to have the friction between wedge 3 and unit 1 relatively great, and various means may be used for this purpose.

In order to reduce the friction between wedge 3 and unit 2, I may proceed in one of the following manners:

The surfaces of contact may be given a high polish;

The materials in contact may be such that they develop small friction between them, for instance, steel on nylon, steel on bronze, steel on the material designated by the registered trade-mark "Teflon" (tetrafluoroethylene);

Surfaces in contact may be suitably treated, for instance, by hard chromizing or sulfinizing with a covering of molybdenum bisulfide.

On the other hand, in order to increase the friction between wedge 3 and unit 1, along slideway $g$ I may use one of the following means:

The materials in contact are suitably chosen;

Use is made of linings such as brake linings, for instance, along the face of wedge 3 that is located opposite slideway $g$;

The section of the cooperating surfaces is suitably chosen, for instance, it is V-shaped.

In this last mentioned case, which is illustrated by FIG. 2, I obtain an increase of the apparent angle of friction in the direction of the relative displacements because, if $\chi$ is the limit angle of friction between the materials in contact and $\beta$ the half angle at the apex of the V, there is the following relation:

$$\operatorname{tg} \varphi = \operatorname{tg} \chi \frac{1}{\sin \beta}$$

$\beta$ being, for instance, of a value ranging from 15 to 45°.

Of course, the above mentioned means may be combined together.

It is thus relatively easy to comply with Relations 2 and 3.

Figure 3:
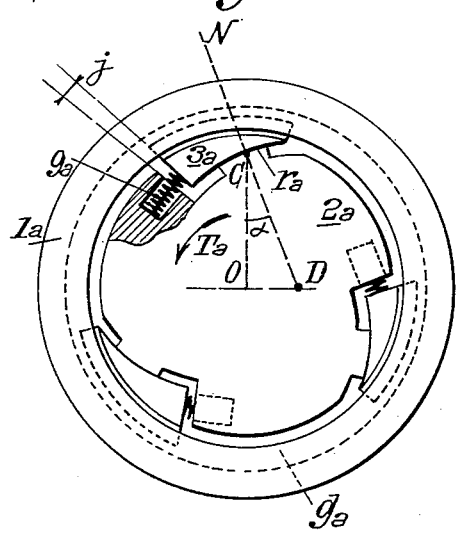
FIG. 3 is a side view, with parts cut away, of a free-wheel made according to the invention.
Figure 4:
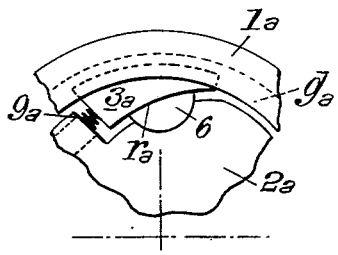
FIG. 4 is a part view similar to FIG. 3 and relating to a modification.
Figure 5:
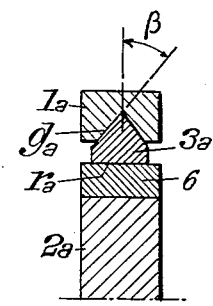
FIG. 5 is a cross section of the free-wheel of FIG. 4.

The principle above set forth in the use of rectilinear movement between units 1 and 2 may easily be applied to a free-wheel as illustrated by FIGS. 3, 4 and 5, where units $1a$ and $2a$ turn with respect to each other about a common axis O, in combination with wedges $3a$ of the above mentioned type, but of curvilinear shape.

Advantageously, in the case of a free-wheel, oblique surfaces $r_a$ are formed, as indicated by FIGS. 4 and 5, on shoes 6 pivotable in unit $2a$.

Owing to this possibility of rotating in their cylindrical bearings with respect to unit $2a$, these shoes take the proper position so that wedges $3a$ are totally applied both against the corresponding surfaces $r_a$ and against the groove-shaped slideway $g_a$ of unit $1a$, whatever be the wear of the mechanism or the possible eccentricity of unit $1a$, with respect to unit $2a$. These shoes 6, which carry surfaces $r_a$ are, for instance, made of Teflon, whereas the other pieces are made of steel.

The surface of the wedge $3a$ that bears on the corresponding oblique surface $r_a$ is a portion of a cylindrical surface having its axis at D, the angle OCD determining the main angle $\alpha$ of the wedge and being consequently chosen to comply with the two conditions above stated which are, on the one hand, that this angle must be great enough to eliminate all possibility of resistance when the clutch is disengaged and small enough to ensure an immediate wedging when the clutch is engaged.

The radius of curvature DC of the oblique surface $r_a$ will be substantially of the same magnitude as the radius OC extending from the axis O to the middle point of oblique surface $r_a$. To be more accurate (FIG. 3), the angle DOC will be chosen very close to 90°, a condition which permits a rather substantial eccentricity of unit $1_a$ with respect to unit $2_a$ without requiring the use of shoes 6. The length of OD is such that angle OCD is greater than the limit angle of friction $\psi$ whatever be the position of point C on surface $r_a$.

Finally, if the free-wheel must work with a quick reciprocating movement it will be of interest to reduce the recoil play $j$ of the wedge with respect to unit $2a$.

Figure 6:
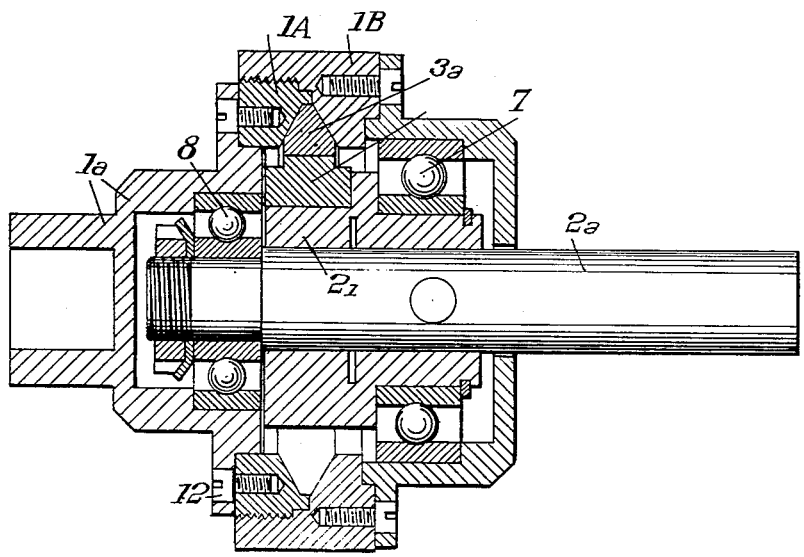
FIG. 6 shows in a more detailed manner a free-wheel made according to the construction of FIGS. 4 and 5.

FIG. 6 shows by way of example a free-wheel mounted between a shaft $2a$ and a coupling sleeve $1a$, with the interposition of ball bearings 7 and 8. The oblique surfaces are formed on shoes 6 journalled in a central unit $2_1$ rigid with shaft $2a$. The V-shaped slideways are formed in two annular elements $1_A$ and $1_B$ fixed with respect to each other and secured by means of screws to sleeve 1.

By way of example, in such a free-wheel, all parts (shoes 6, wedges $3a$, annular members $1_A$ and $1_B$ (might be made of steel, shoes 6 with the oblique surfaces being made of sulfinized case hardening steel covered with molybdenum bisulfide. In these conditions, and if angle $\beta$ is given a value equal to 30°, the various parameters have the following values:

$$\operatorname{tg} \chi = 0.10$$
$$\operatorname{tg} \varphi = 0.20$$
$$\operatorname{tg} \psi = 0.04$$

It follows that $\varphi = 11° 20'$ and $\psi = 2° 20'$ so that:

$$\varphi - \psi = 9°$$

In order to comply with Relation 3, $\alpha$ should be chosen for instance equal to 6° so that tg $\alpha$ has a value equal approximately to 0.10.

Therefore Relation 3 becomes:

$$2° 20' < 6° < 9°$$

Shoes 6 might be made of tetrafluoroethylene (Teflon), for which tg $\psi$ is equal approximately to 0.04.

FIG. 7 now shows another embodiment of the invention wherein the oblique surfaces $r_b$ of unit $2b$ are helical surfaces, the wedging means consisting of members $3b$ coaxial with shaft $2b$ and having each, on one side, a helical surface $r_b$ adapted to fit against the corresponding oblique surface and, on the other side, a conical surface adapted to fit against a corresponding conical surface $g_b$ carried by unit 1.

According to my invention, the pitch of these helical surfaces is chosen such that the angle $\alpha$ made by these surfaces with a plane perpendicular to the axis of shaft $2b$ corresponds to the condition:

(4) $\qquad \alpha > \psi$

In the construction of FIG. 7, H is the mean radius of helical surfaces and R is the mean radius of the conical slideways $g_b$, whereas $\beta$ is the half angle at the apex of these conical surfaces, so that the wedging condition is as follows:

(5) $\qquad R \dfrac{\operatorname{tg} \varphi}{\sin \beta} > H (\operatorname{tg} \psi \operatorname{tg} \alpha)$ Wedging members $3b$ are applied against the slideways $g_b$ of unit 1 by springs 9 which tend to screw them on the helical surfaces $r$ in the direction that applied them against unit 1.

In this construction the friction coefficients tg $\varphi$ and tg $\psi$ may be equal to each other, and tg $\psi$ may even be greater than tg $\varphi$, because a suitable choice of the ratio $$\frac{R}{H}$$

makes it possible to comply with Conditions 4 and 5. But of course, in order to make the mechanism as small as possible a suitable choice of ratio $$\frac{R}{H}$$

may be combined with means as above indicated for reducing tg $\psi$ and increasing tg $\varphi$.

In particular, in order to increase the friction work upon the slideways it is possible, as shown by the modification of FIG. 9, to make use of clutch discs 12, 13, interposed between the wedging members 3c and unit 1c. As in the case of disc clutches, ribs or splines are provided in the wedging member 3c and in unit 1c to permit axial displacement of the discs while fixing the discs angularly with respect to unit 1c (for discs 12) and with wedging member 3c (for discs 13).

In this case, the wedging condition, if every wedging member carries $n$ clutch discs becomes:

(6)   $(2n+1)\ R\ \text{tg}\ \varphi > H\ (\text{tg}\ \psi + \text{tg}\ \alpha)$ so that the arrangement is the same as if the number of slideways was multiplied by $(2n+1)$.

This kind of free-wheel, making use of helical surfaces, has the advantage that it is not influenced by the action of the centrifugal force, if the wedging members are suitably balanced. It may also be arranged to permit an operation at high frequency, owing, for instance, to the provision of abutment pins 11, interposed between the wedging members 3b or 3c and shaft 2b or 2c and the function of which is to permit only a slight recoil in rotation of said wedging members.

These pins 11 give the wedging members a possibility of rotation with respect to the shaft just sufficient to insure a good bearing of these wedging members upon unit 1b or 1c, and upon the oblique surface $r_b$ or $r_c$, so as to limit the recoil of these wedging members in case of operation of the free-wheel with a high frequency reciprocating movement. Adjustment is made possible by exchanging a disc K, of suitable thickness, which may be removed by loosening screws X.

As in other types of free-wheels, wedging of the mechanism or reversal of the direction of operation may be obtained by means of auxiliary mechanisms.

The free-wheel devices according to the invention have many advantages and, in particular, the following ones:

They eleminate any resistance when the free-wheel is disengaged;

They permit the transmission of important torques, owing to the fact that the loads are distributed without local overloading, contrary to what takes place, for instance, with free-wheels making use of balls, rollers or intermediate round bodies;

They reduce wear and tear to a minimum.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A free-wheel device which comprises, in combination, two units, a first one and a second one, mounted movable with respect to each other perpendicularly to one direction, said first unit comprising, fixed with respect thereto at least perpendicularly to said direction, two slideways perpendicular to said direction and facing each other, said second unit comprising, fixed with respect thereto, an oblique surface turned toward one of said slideways and an oblique surface turned toward the other of said slideways, respectively, said oblique surfaces, making each a given obliquity angle with respect to the corresponding slideway, respectively, and two wedging members each inserted between one of said slideways of said first unit and the oblique surface of the second unit that is turned toward said last mentioned slideway, each of said wedging members having one face thereof of the same shape as the slideway with which it is in contact and the other face thereof of the same shape as the oblique surface with which it is in contact, said units being arranged so that, for a virtual relative displacement thereof, the friction work is greater between each of said wedging members and the slideway against which it is bearing than between said wedging member and the oblique surface against which it is bearing, said angle of obliquity of each of said oblique surfaces being at least equal to the limit angle of friction of the corresponding wedging member with respect to said oblique surface, and said wedging members being disposed so that their respective reactions perpendicular to said slideways balance each other.

2. A free-wheel device which comprises, in combination, two units, a first one and a second one, mounted rotatable with respect to each other about an axis, said first unit comprising, fixed angularly wtih respect thereto, two slideways of revolution about said axis and facing each other, said second unit comprising, fixed with respect thereto, a helical surface turned toward one of said slideways and a helical surface turned toward the other of said slideways, respectively, said helical surfaces, each of which has a given pitch angle, having said axis as their common axis, and two wedging members each inserted between one of said slideways of said first unit and the helical surface of the second unit that is turned toward said last mentioned slideway, each of said wedging members having one face thereof of the same shape as the slideway with which it is in contact and the other face thereof of the same shape as the helical surface with which it is in contact, said units being arranged so that, for a virtual relative rotation thereof, the friction work is greater between each of said wedging members and the slideway against which it is bearing than between said wedging member and the helical surface against which it is bearing, the pitch angle of each of said helical surfaces being at least equal to the limit angle of friction of the corresponding wedging member with respect to said helical surface, and said wedging members being disposed so that their respective reactions perpendicular to said slideways balance each other.

3. A free-wheel device according to claim 2 further including abutment means between each of said wedging members and one of said units for limiting the angular displacement of said wedging member with respect to said mentioned unit.

4. A free-wheel device which comprises, in combination, two units, an outer one and an inner one, mounted rotatable with respect to each other about an axis, said outer unit comprising, fixed with respect thereto, two slideways of revolution about said axis and facing each other, said slideways being in the form of frusto-conical surfaces of the same apex angle, said inner unit comprising, fixed with respect thereto, a helical surface turned toward one of said slideways and a helical surface turned toward the other of said slideways, respectively, said helical surfaces, which have the same pitch angle, having said axis as their common axis, the mean radius of said helical surfaces about said axis being smaller than the mean radius of said slideways about said axis, and two wedging members each inserted between one of said slideways of said outer unit and the helical surface of the inner unit that is turned toward said last mentioned slideway, each of said wedging members having one face thereof of the same shape as the slideway with which it is in contact and the other face thereof of the same shape as the helical surface with which it is in contact, said units being arranged so that, for a virtual relative rotation thereof, the friction work is greater between each of said wedging members and the slideway against which it is bearing than between said wedging member and the helical surface against which it is bearing, the pitch angle of each of said helical surfaces being at least equal to the limit angle of friction of the corresponding wedging member with respect to said helical surface, said wedging members being disposed so that their respective reactions perpendicular to said slideways balance each other, and spring means for urging said wedging members away from each other.

5. A free-wheel device which comprises, in combination, two units, an outer one and an inner one, mounted rotatable with respect to each other about an axis, said outer unit comprising, fixed angularly with respect thereto, two slideways of revolution about said axis and facing each other, each of said slideways comprising a plurality of clutch discs transverse to said axis and fixed angularly with respect to said outer unit but movable in the direction of said axis, said inner unit comprising fixed with respect thereto, a helical surface turned toward one of said slideways and a helical surface turned toward the other of said slideways, respectively, said helical surfaces, which have the same pitch angle, having said axis as their common axis, the mean radius of said helical surfaces about said axis being smaller than the mean radius of said clutch discs about said axis, and two wedging members each inserted between one of said slideways of said inner unit and the helical surface of the inner unit that is turned toward said last mentioned slideway, each of said wedging members comprising, fixed angularly with respect thereto but movable in the direction of said axis, clutch discs adapted to cooperate with said first mentioned clutch discs between which they are inserted, respectively and having a face thereof of the same shape as the helical surface with which it is in contact, said units being arranged so that, for a virtual relative rotation thereof, the friction work is greater between each of said wedging members and the slideway against which it is bearing than between said wedging member and the helical surface against which it is bearing, the pitch angle of each of said helical surfaces being at least equal to the limit angle of friction of the corresponding wedging member with respect to said helical surface, and said wedging members being disposed so that their respective reactions perpendicular to said slideways balance each other, and spring means for urging said wedging members away from each other.

References Cited in the file of this patent

UNITED STATES PATENTS

| | | |
|---|---|---|
| 88,703 | Ferguson | Apr. 6, 1869 |
| 337,021 | Scott | Mar. 2, 1886 |
| 1,928,191 | Van Meurs | Sept. 26, 1933 |
| 2,013,413 | Lazzarini | Sept. 3, 1935 |
| 3,044,591 | Kilness | July 17, 1962 |

FOREIGN PATENTS

| | | |
|---|---|---|
| 433,036 | Germany | Aug. 19, 1926 |
| 871,857 | Germany | Mar. 26, 1953 |
| 1,100,460 | France | Apr. 6, 1955 |
| 206,616 | Austria | Dec. 10, 1959 |